June 21, 1949.   G. H. STONER   2,474,072
AIR BEARING GYROSCOPE
Filed Feb. 7, 1946

INVENTOR.
GEORGE H. STONER
BY Glenn Orlob
AGENT

Patented June 21, 1949

2,474,072

UNITED STATES PATENT OFFICE 2,474,072

AIR BEARING GYROSCOPE

George H. Stoner, Seattle, Wash., assignor to Boeing Airplane Company, a corporation of Delaware Application February 7, 1946, Serial No. 646,083

6 Claims. (Cl. 74—5.7)

My invention relates to an air bearing for supporting gyroscopes and the like without the use of gimbal rings.

Gimbal mounted gyroscopes have been developed which are capable of responding to the maneuvers of a rapidly moving object such as an airplane. However, the gimbal ring system of support for gyroscopes requires the use of very high precision bearings and a highly specialized balancing technique for the gyroscope housing and the gimbal rings.

Many gyroscope applications require a gyroscope mounted with freedom of rotation about its center of gravity, but whose spin axis need only have freedom within a cone of about ±20° from the axis of the mount. In attempting to simplify the conventional mechanical system for mounting gyroscopes, a spherical fluid bearing has been developed which takes the place of the entire gimbal ring system in the conventional free gyro.

It is the principal object of this invention to provide a maneuvering gyroscope supported by a single fluid bearing which requires no mechanical system of support.

It is a further object of the instant invention to provide a support for a gyroscope which requires no precision bearings and which may be entirely constructed of simple die castings or lathe turned parts requiring only ordinary mechanical precision.

Other objects of the invention will appear from the following description taken in connection with the drawing, which forms a part of this specification, and in which.

Figure 1:
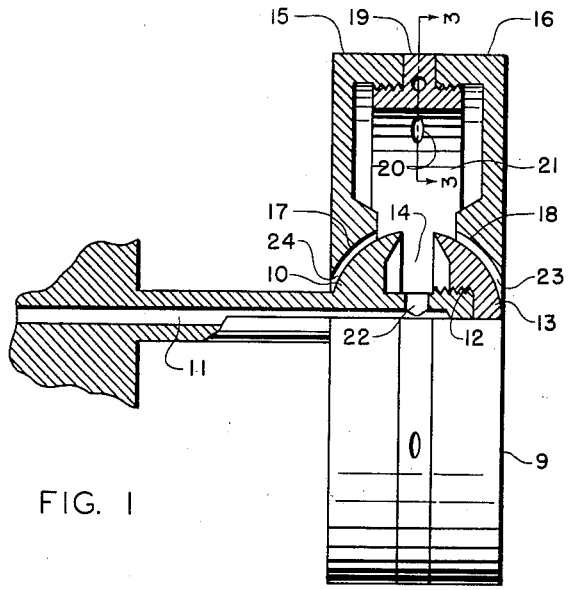
Figure 1 is a sectional view showing the preferred form of the invention.

According to the present invention there is provided a spherical bearing having a fixed supporting ball which ejects air under high pressure into the interior chamber of a cooperating fluid-supported hollow gyro wheel rotated at high speed by propulsion jets located in the periphery of the gyro. The rotating gyro is journaled without physical contact with the supporting ball by the fluid pressure within the interior of the gyro and by the Bernoulli effect of high pressure fluid escaping to the atmosphere through the restricted passages between the supporting ball and the cooperating interior surfaces of the gyro rotor.

The device shown in the accompanying drawings consists of a fixed ball element, and a gyro wheel element which is normally pneumatically supported and simultaneously rotated on the fixed ball element. The fixed ball element is preferably formed by two opposed spherical segments 10 and 13 separated by an intermediate fluid chamber 14. Spherical segment 10 may be fixedly supported by the stationary conduit 11 and may carry an integral stud portion 12 adapted to threadedly engage the opposed spherical segment 13.

Figure 3:
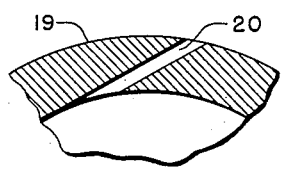
Figure 3 is a sectional view on the line 3—3 in Figure 1.

The preferred form of gyro rotor 9 illustrated in Figure 1 is composed of two opposed disk elements 15 and 16, having internal spherical segments 17 and 18 cooperating with but not normally in physical contact with the respective spherical segments 10 and 13. The opposed disk elements 15 and 16 are threadedly engaged with an interconnecting ring 19 having in its periphery a series of angularly directed propulsion jets 20 connecting with the outside atmosphere the annular air chamber 21 intermediate the disk elements 15 and 16, as illustrated by Figure 3.

In the operation of this invention a compressed fluid such as air obtained from an adequate source of supply is fed into the air chamber 14 through the conduit 11 and the orifice 22. This compressed fluid is free either to pass from the chamber 14 into the annular air chamber 21 or to escape to the atmosphere through the Bernoulli passages 23 and 24 formed adjacent to the surfaces of the spherical segments 10 and 13. A portion of the compressed fluid expanding into the annular fluid chamber 21 escapes to the atmosphere through the propulsion jets 20 which rotate with the gyroscope 9.

The quantity of compressed fluid supplied through the conduit 11 is such as to maintain a substantially constant pressure in the annular fluid chamber 21 of approximately 100 pounds per square inch. It has been found that the proper proportioning of Bernoulli's passages 23 and 24 is desirable in the practice of the subject invention, and operating clearances of the order of .01 inch between the spherical segments (10 and 13) and the cooperating internal spherical segments (17 and 18) have been satisfactorily used in a working model of this invention. The best clearance for the passages 23 and 24 depends in part upon the particular design and the conditions of operation, and for optimum operation is best determined by experimental means. If the gyro rotor 9 is displaced on the ball formed by the spherical segments 10 and 13 in such a way as to decrease the cross section of one of the Bernoulli passages 23 or 24 at a given point, the viscosity and turbulence of the fluid act to decrease the flow velocity, thereby increasing the fluid pressure at the given point. At the same time, the Bernoulli passage on the other side of the ball has been increased in cross section thus increasing the flow velocity and decreasing the pressure in the Bernoulli passage diametrically opposed to the given point. The result of the temporarily unbalanced high pressure flow in the passages 23 and 24 is to force the gyro rotor 9 back to a central position with respect to the ball formed by the spherical segments 10 and 13.

Propulsion of the gyroscope rotor 9 is obtained from the jets 20 which receive fluid under pressure from the annular air chamber 21 in the rotor 9. Since the propulsion jets 20 rotate with the gyroscope 9, the torques produced are always symmetrical about the spin axis of the gyroscope 9 and exert no moment thereon.

Figure 2:
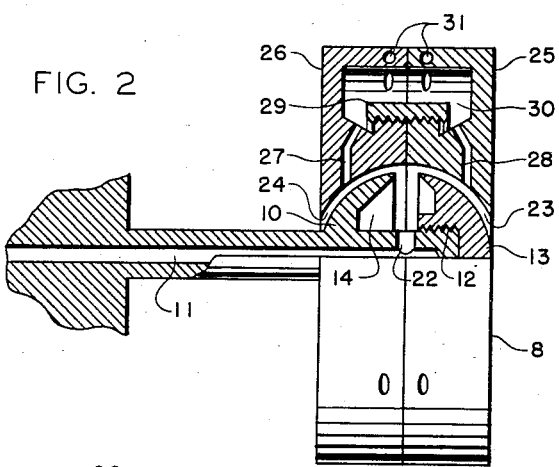
Figure 2 is a sectional view showing a modified form of the invention.

Figure 2 illustrates a modified form of the invention in which all of the fluid flowing radially outwardly through the fluid chamber 14 impinges against an interior surface of the gyro rotor 8 and through part of the length of the passages 23 and 24 before a portion of the total mass of fluid is diverted to the chamber 30 by the interconnecting passages 28 and 27. In this embodiment the rotor 8 is composed of two opposed disk elements 25 and 26 which are threadedly engaged with the ring 29 and include channels 27 and 28 interconnecting the annular fluid chamber 30 with the Bernoulli passages 23 and 24. The propulsion jets 31 allow compressed fluid in the annular chamber 30 to escape to the atmosphere tangentially of the rotor 8 to produce rotation of the gyro.

The pneumatic bearing gyro disclosed herein can be used to improve the accuracy of conventional gyroscope instruments, such as automatic pilot reference systems for aircraft, and can be made entirely out of simple die cast or turned parts, completely eliminating the critical tolerances, expensive precision bearings, and balancing techniques which must be used in manufacturing conventional gimbal-mounted gyroscopes.

While the forms of apparatus herein described constitute preferred embodiments of the invention, it is to be understood that the invention is not limited to these precise forms, and that changes may be made therein without departing from the scope of the invention which is defined in the appended claims.

I claim:

1. A pneumatic bearing gyroscope or the like comprising a pair of concentric spherical ball segments fixedly supported on a conduit and defining a fluid chamber intermediate said spherical ball segments, means for supplying pneumatic pressure to said fluid chamber including an orifice connecting said fluid chamber with said conduit, and a gyroscope wheel normally pneumatically supported on said spherical ball segments comprising a pair of opposed disk elements forming an annular fluid chamber communicating with said intermediate fluid chamber and each having an outer flange and an interior spherical segment, propulsion orifices adjacent to each of said outer flanges communicating said annular fluid chamber with the atmosphere and adapted to rotate said gyroscope wheel, passages intermediate said interior spherical segments and said spherical ball segments communicating said annular fluid chamber with the atmosphere and adapted to pneumatically support said gyroscope wheel centrally on said spherical ball segments, and means for holding said pair of disk elements in opposed engagement.

2. A pneumatic bearing gyroscope or the like comprising a pair of concentric opposed spherical ball segments fixedly supported on a hollow shaft and having a fluid chamber intermediate said opposed spherical ball segments, means to supply pneumatic pressure to said fluid chamber, and a gyroscope wheel pneumatically supported on said opposed ball segments comprising a pair of opposed disk elements each having an exterior flange and an interior spherical segment forming an annular fluid chamber, propulsion jets in said exterior flange communicating said annular fluid chamber with the atmosphere and adapted to cause rotation of said gyroscope wheel by the efflux of fluid from said propulsion jets, passages intermediate said interior spherical segments and said spherical ball segments communicating said intermediate fluid chamber with the annular fluid chamber and with the atmosphere, whereby said gyroscope wheel is supported centrally on said spherical ball segments without physical contact therewith by the flow of high pressure fluid intermediate the surface of said ball segments and said interior spherical segments.

3. A pneumatic bearing comprising a pair of concentric spherical ball segments fixedly supported on a shaft and defining a fluid chamber intermediate said ball segments, a conduit for supplying pneumatic pressure to said fluid chamber, and a wheel having a plurality of jets in the periphery of said wheel in fluid flow relationship with said fluid chamber adapted to cause rotation of said wheel by the efflux of fluid from said jets, said wheel having interior segments cooperating with said ball segments for normally supporting said wheel centrally on said ball segments without physical contact therewith by the efflux of fluid from said fluid chamber to the outside atmosphere through the passages intermediate said ball segments and the cooperating internal surfaces of said interior segments.

4. A pneumatic bearing gyroscope comprising a pair of fixedly supported concentric spherical ball segments having a pressurized fluid chamber therebetween, a gyroscope wheel having an annular chamber in fluid flow relationship with said fluid chamber and having internal spherical segments having a diameter greater than the diameter of said ball segments for normally supporting said wheel centrally on said ball segments without physical contact therewith as a result of discharge of a first portion of the fluid in said annular chamber to the outside atmosphere through the space intermediate said ball segments and said interior spherical segments, and jet propulsion means in the periphery of said wheel for rotating said wheel by the discharge of a second portion of the fluid in said annular chamber to the outside atmosphere.

5. A pneumatic bearing gyroscope comprising a plurality of fixedly supported concentric ball segments having a pressurized fluid chamber intermediate said ball segments, a gyroscope wheel having a space in fluid flow relationship with said fluid chamber and including a plurality of internal spherical segments forming a fluid discharge passage adjacent to the surface of said ball segments for communicating said fluid chamber with the outside atmosphere, said discharge passage being adapted to normally cause support of said wheel centrally on said ball segments solely by fluid discharge means, and jet discharge means in the periphery of said wheel communicating said space with the outside atmosphere and operable to produce rotation of said wheel with respect to said ball segments.

6. A pneumatic bearing comprising a plurality of fixedly supported concentric ball segments having a pressurized fluid chamber intermediate said ball segments, a wheel having a plurality of internal spherical segments adjacent to said ball segments defining therewith restricted passages communicating with said fluid chamber, whereby said wheel is supported on said ball segments solely by action of fluid flowing through said restricted passages.

GEORGE H. STONER.

REFERENCES CITED

The following references are of record in the file of this patent:

UNITED STATES PATENTS

| Number | Name | Date |
| --- | --- | --- |
| 1,932,412 | Keen | Oct. 31, 1933 |
| 2,086,896 | Carter | July 13, 1937 |
| 2,133,809 | Carter et al. | Oct. 18, 1938 |
| 2,142,018 | Carter | Dec. 27, 1938 |
| 2,158,048 | Braddon | May 9, 1939 |